United States Patent [19]
Bunin et al.

[11] Patent Number: 5,370,477
[45] Date of Patent: Dec. 6, 1994

[54] IN-SITU DECONTAMINATION WITH ELECTROMAGNETIC ENERGY IN A WELL ARRAY

[75] Inventors: Haim H. Bunin, Haifa, Israel; Michael M. Uziel, Northridge, Calif.

[73] Assignee: Enviropro, Inc., Chatsworth, Calif.

[21] Appl. No.: 997,955

[22] Filed: Dec. 24, 1992

Related U.S. Application Data

[63] Continuation-in-part of Ser. No. 830,546, Jan. 31, 1992, abandoned, which is a continuation-in-part of Ser. No. 625,970, Dec. 10, 1990, abandoned.

[51] Int. Cl.⁵ .................. E21B 36/00; E21B 43/24
[52] U.S. Cl. .................. 405/128; 405/131; 166/60; 166/248; 166/302; 219/710
[58] Field of Search ............... 405/128, 129, 130, 131, 405/258; 219/10.55 M, 10.55 R, 10.57, 10.75, 10.77; 166/60, 248, 249, 302

[56] References Cited
U.S. PATENT DOCUMENTS

| | | | |
|---|---|---|---|
| 2,757,738 | 8/1956 | Ritchey | 166/39 |
| 3,170,519 | 2/1965 | Haagensen | 166/60 |
| 4,140,179 | 2/1979 | Kasevich et al. | 166/248 |
| 4,193,451 | 3/1980 | Dauphine | 166/248 |
| 4,320,801 | 3/1982 | Rowland et al. | 166/248 |
| 4,620,593 | 11/1986 | Haagensen | 166/248 |
| 4,638,863 | 1/1987 | Wilson | 166/248 |
| 4,884,634 | 12/1989 | Ellingsen | 166/248 |
| 4,951,748 | 8/1990 | Gill et al. | 166/248 |
| 4,973,811 | 11/1990 | Bass | 219/10.57 |
| 5,065,819 | 11/1991 | Kasevich | 166/248 |
| 5,076,727 | 12/1991 | Johnson et al. | 405/128 |
| 5,082,054 | 1/1992 | Kiamenesh | 166/248 |

Primary Examiner—Randolph A. Reese
Assistant Examiner—John Ricci
Attorney, Agent, or Firm—Marvin E. Jacobs

[57] ABSTRACT

In-situ decontamination of soil is accomplished by providing electromagnetic energy of relatively short wavelengths from an array of applicators (antennas), inserted into a borehole array that encompasses the contaminated zone. The borehole array geometry is designed according to the soil's thermophysical properties. Electromagnetic energy heating and heat transfer mechanisms are used to raise the temperature of the soil to the desired level for vaporization of contaminants while at the same time avoiding excessive heat loss from the much larger array size. Heating is maintained throughout the contaminated zone after the final temperature has been reached by proper compensation of the envelope heat loss. Contaminants are evaporated by the heating. Contaminant vapors are collected by vapor collection pipes and/or a gas cover over the soil being heated. The contaminant vapors are then reduced in volume to manageably safe levels and then treated and/or disposed of. The release of contaminant vapors from the soil may be enhanced by the application of sound energy to the soil.

30 Claims, 8 Drawing Sheets

IN-SITU DECONTAMINATION WITH ELECTROMAGNETIC ENERGY IN A WELL ARRAY

CROSS-REFERENCE TO RELATED APPLICATIONS:

This application is a continuation-in-part of application Ser. No. 07/830,546, filed Jan. 31, 1992, now abandoned, which in turn is a continuation-in-part of Ser. No. 07/625,970, filed Dec. 10, 1990, now abandoned.

FIELD OF THE INVENTION

The present invention relates generally to the thermal decontamination of contaminated soils and solid waste as defined by the Environmental Protection Agency. More particularly, the present invention relates to the thermal decontamination of soils and solid waste by the use of electromagnetic waves having relatively short wavelengths.

BACKGROUND OF THE INVENTION

Thermal remediation of contaminated soils and solid waste ("soil" and "soil") is a well known and effective technology. However, treatment cost is a major problem. Most thermal treatment methods require excavation and decontamination above ground, either on-site or at a remote treatment location, and then replacement of the treated soil.

Excavation and disposal of contaminated soil in landfills is also expensive and is becoming more and more restricted by law. It is also risky in terms of future liability. In some contaminated soil cases, such as contamination caused by tank leaks in urban or industrial areas, excavation is very expensive and sometimes even impossible without causing damage to surrounding structures. In situ treatment methods have distinct advantages over these methods in that they avoid extensive excavation costs and increase safety during treatment.

Possible in situ treatment methods involve heating the soil with electromagnetic energy radiated from an antenna placed in a wellbore in the ground. When a single wellbore is heated with electromagnetic (EM) energy, radiated from an antenna, the EM field attenuation, as a function of the radius, is dominated by two factors: (1) cylindrical attenuation of the field power strength (by a factor of $1/x$ for a long cylinder), and (2) exponential decay due to soil penetration depth, defined as the distance where power is attenuated to 0.37 of its initial surface value.

The penetration depth of EM energy is inversely related to the frequency, the apparent AC conductivity, and the loss tangent of the material. At the beginning of the heating process, this penetration depth is small due to the moisture of the soil. As the heating process advances, the moisture is evaporated in growing radial layers. The maximum penetration depth that is reached is that achieved when the soil is dry.

EM heating creates a highly nonuniform temperature profile along the well radius which is proportional to $1/r \, e^{-(r-r_0)/\beta_0}$ (where $r_0$ is the physical well radius, $r$ is the radial distance from the well center, and $\beta_0$ is the EM penetration depth). The result of the excessive overheating near the well and underheating away from the well is poor application efficiency of the electromagnetic energy (0.25-0.37).

Another problem arising from the nonuniform heating is that for large ratios of the wellbore heating radius to the wellbore physical radius, the temperature at the wellbore is very high, imposing severe limitations on well materials and causing overheating problems.

Uniform heating is also not possible in a single wellbore even when both low frequencies (large penetration depth) and thermal conductivity are used. The reason for this is that the formation is continuously conducting the heat outward. If heat transfer is used to get a more uniform heating for certain distances, the same heat conduction property of the soil will dissipate the heat to the surrounding zone.

A vacuum extraction (VE) method can also be used to remove contamination from the ground. This method, however, is only effective for a narrower range of contaminants than thermal treatment methods are, and it entails very long treatment times (up to years) which are also difficult to predict. In this method (VE), only contaminants with relatively high vapor pressure are removed. Low vapor pressure fractions of these materials are left behind. Materials such as diesel fuel, for example, constitute of a variety of compounds with high and low vapor pressure. Vacuum extraction therefore, will selectively remove the high vapor pressure. Vacuum extraction therefore, will selectively remove the high vapor pressure fraction of contamination and leave behind high molecular weight low vapor pressure materials.

U.S. Pat. No. 4,886,118 to Van Meurs et al. describes a method of producing oil from substantially impermeable subterranean oil shale by use of heaters (electrical or others) placed in wells which conduct heat in the oil shale. The use of heat conduction alone, to transfer the heat from the wellbore physical radius outside limits the power and heating rate for a given maximum allowable wellbore temperature, resulting in very long heating times. In addition, separation of heating and production wells increases costs by increasing the total number of wells by a factor of 3.

U.S. Pat. No. 4,376,598 to Brouns et al. discloses in situ vitrification of soils by conduction heating at very high temperatures (1500° C.) in order to immobilize radioactive contaminants. The vitrification process is an expensive method, requiring very high energy.

U.S. Pat. No. 4,670,634 to Bridges et al. discloses an in situ radio frequency (RF) heating method for decontamination of soils. Contaminated soil is subjected to RF energy via an array of electrodes placed above the ground. Soil heating results from the fringe field of the electrodes. As a result of the fact that the electrodes are placed above ground, heating depth is very limited (about 3 feet) and the temperature profile is strongly nonuniform.

U.S. Pat. No. Re. 30,738 to Bridges discloses an apparatus and method for RF in situ heating to produce petroleum products. A plurality of conductors are inserted in the formation and bound particular volumes of the formation. This is equivalent to a "triplate" parallel capacitor, with relatively uniform field, except for the edges. One disadvantage of this system is that it can only heat an area of rectangular shape. Since volumes of contamination are rarely of rectangular shape, this system is inefficient because the heated region includes areas that are not contaminated. This system is particularly inefficient in medium and small sites that cannot be economically subdivided into smaller modules. It is also inefficient for decontamination of soils due to tank leaks or nonuniform spreading leaks, or point leaks at hazardous waste disposal sites, or mixed chemical and radioactive waste disposal sites, landfills, or underground tanks containing a mixture of radioactive and chemical waste and the like which might have irregular, elongate contamination regions. Other disadvantages of this method and other in situ RF heating methods compared to shorter microwave methods are:

(1) Metal objects such as pipes, metal drums and other metal objects buried in the contaminated ground or in landfills, or underground utilities such as buried electrical or telephone lines, water or sewer lines, will alter the desired electric field pattern resulting in nonuniform heating, and (2) Bound wave RF structures are very sensitive to the vast changes of the soil electrical properties, especially during moisture evaporation, which complicates impedance matching of the generator to the soil.

U.S. Pat. No. 4,817,711 to Jeamby discloses a system for recovery of pertroleum from a well by microwave heating. This system provides nonuniform heating and very long heating times.

U.S. Pat. No. 4,590,348 to Lahti et al. discloses a system for thawing frozen ground by microwave heaters. The heating is local heating with a relatively small heating range limited by the immediate effect of the EM soil penetration depth.

SUMMARY OF THE INVENTION

It is among the objectives and advantages of this invention to overcome the problem of nonuniform heating of wells and to provide an economical and efficient process for in situ thermal treatment of soils.

It is among the further objectives and advantages of this invention to provide a method for effective sustainment of uniform heating after final temperature is reached by compensating heat loss from the envelope and other possible sources. It is among still further objectives of the invention to provide a means of automatically controlling the heating process by thermostatic control. This control can be implemented independently for any desired regions within the contaminated zone. The use of a modular approach in heating the contaminated zone enables automatic compensation of different zone thermophysical properties (due to different soil type contamination and moisture content, for example), and different heat loss mechanisms (like automatic compensation of heat loss from the envelope).

Heating is provided by electromagnetic energy generators and an array of applicators (antennas) inserted into a borehole array. Each applicator heats the immediate region surrounding it (approximately midway to the next well in the borehole array). The frequency applied to each of the applicators is selected with penetration depth limited to approximately the well heating region so as to establish a substantially non-radiating out-of-ground electric field whose attenuation may be (if necessary) further enhanced by the existence of an above-ground metallic net. Sound energy may also be applied in or near the wells in order to enhance the movement of contamination from the soil. The relatively dense borehole array is also used for fast extraction and collection of the contaminated materials. Heated contaminants vaporize, and the vapors are collected by means of applied vacuum on the formation at the boreholes of the well bore array. In this arrangement, some or all boreholes are used directly also as vapor collection wells, by having a vapor collection pipe installed adjacent to the antenna. This pipe is used to evacuate the surrounding formation, it is then manifolded to a collection pipe that conducts the vapors to a central collection and treatment system. A gas safety cover may be also (if necessary) provided for collection of those vapors if any are escaping from the ground. These vapors are then safely treated and disposed of by an suitable technique known in the art.

DETAILED DESCRIPTION OF THE PREFERRED EMBODIMENT

Figure 1:
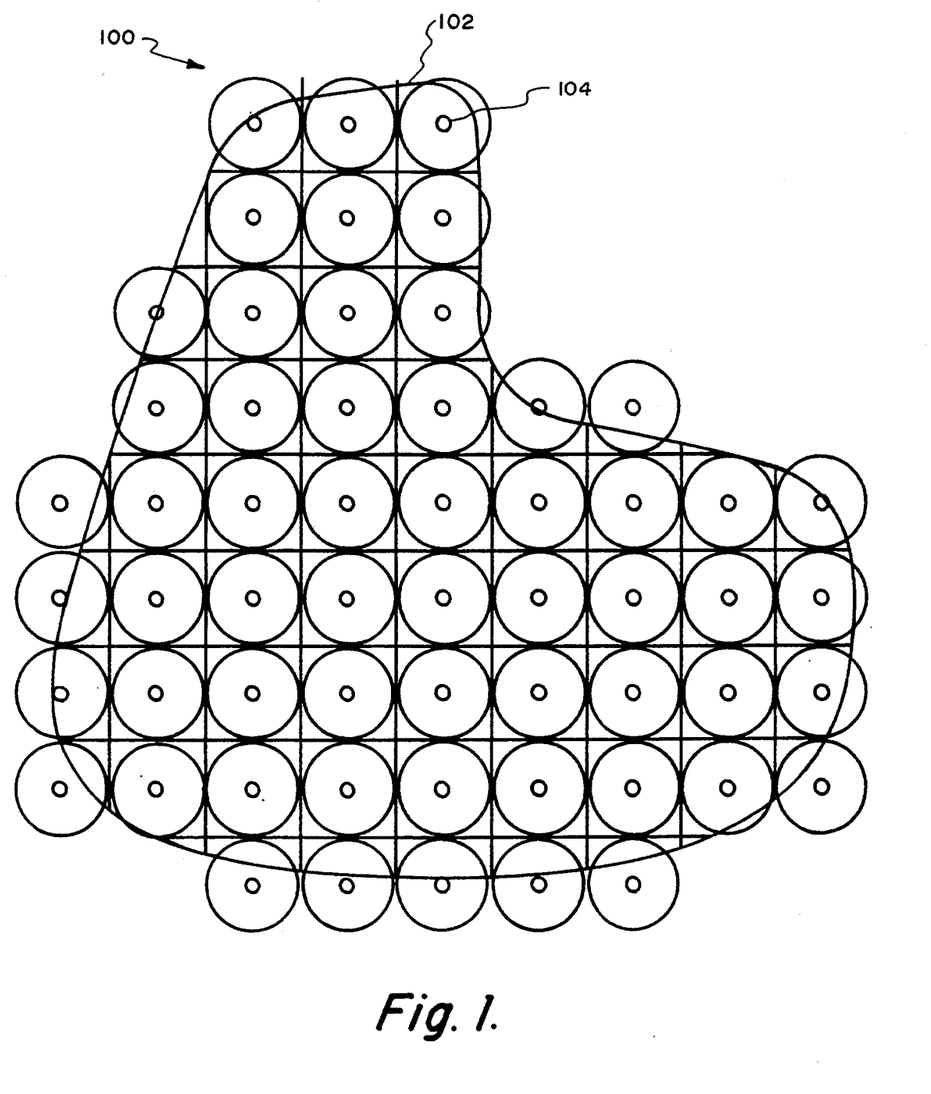
FIG. 1 is a plan view of a borehole array covering a contaminated region.

FIG. 1 is a plan view of a wellbore array 100 constructed in accordance with the present invention. The lateral and vertical extent of a contaminated region 102 is determined by drilling wells and testing for the presence and depth of contaminants.

In the basic configuration, after defining the lateral and vertical extent of the contamination, a plurality of uniformly spaced wells 104 are drilled above the contaminated region 102. The wells 104 can be further exploited to further determine the limits of the contamination region.

Figure 2:
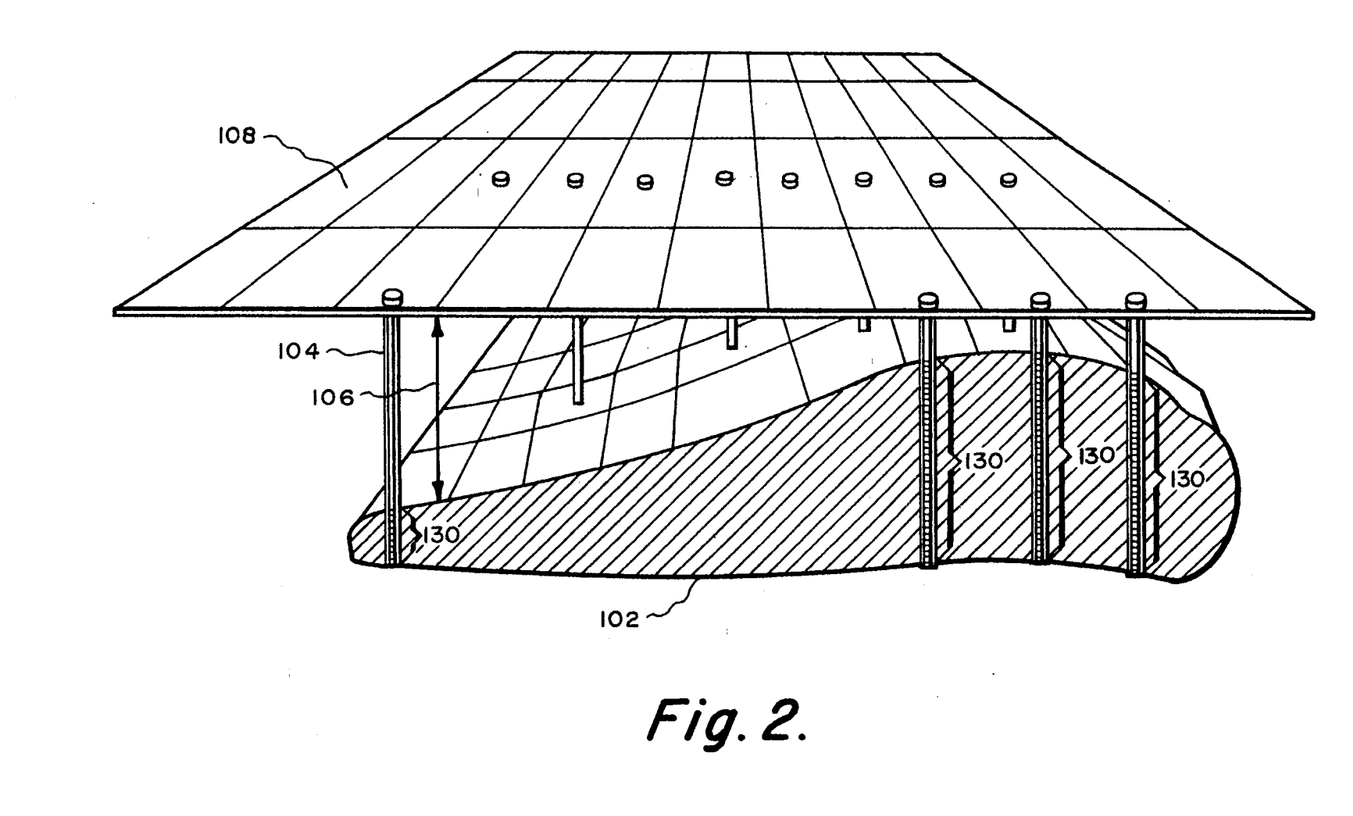
FIG. 2 is a cross-sectional side view of soil having a contamination region.

Referring to FIG. 2, the wells 104 are vertically heated below the ground surface 108 only on sections 130 covering the vertical extent of the contamination region 102, plus an extra safety margin. In this way, the cleanup is optimized by encompassing the contamination region 102 only. An overburdened region is indicated at 106.

The approach of the present invention is modular. This optimizes the cleanup cost and cleanup result. Each well 104 is equipped with an identical applicator. The number of applicators is determined by the volume and shape of the contamination region 102. The modular approach has economical, operational, technical, reliability and safety advantages with simpler implementation when compared to a method of delivering very high power from a single, central electromagnetic radiation unit.

Figure 3:
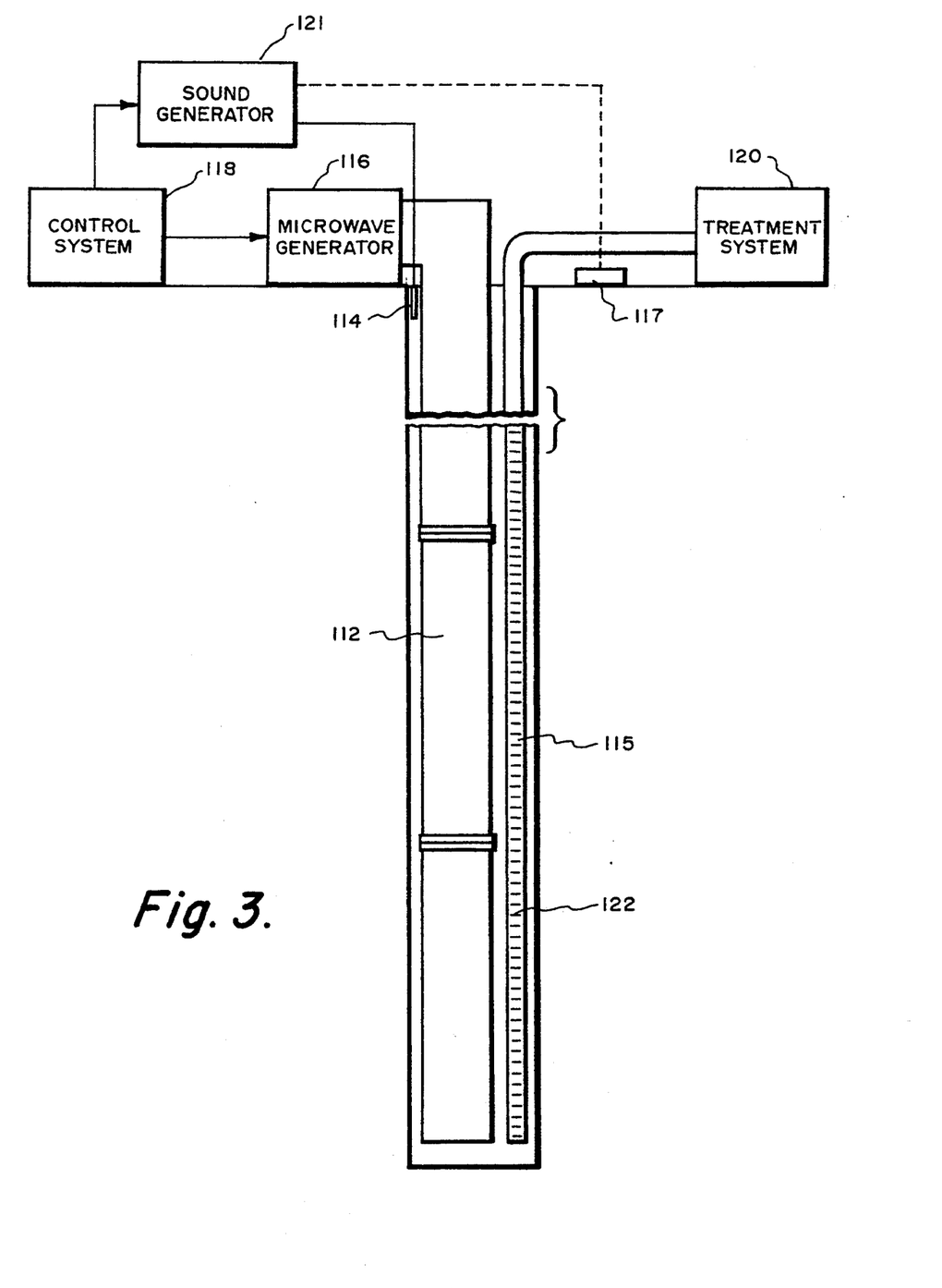
FIG. 3 is a cross-sectional view of a well of the present invention.

FIG. 3 is a sectional view of an exemplary wellbore equipped with an antenna 112 (slotted waveguide type), a sound energy applicator 114 and vapor collection pipe 115. The antenna is connected to a microwave generator 116 which is operated by a control system 118. The vapors collected by the pipe 115 are transferred to a central treatment system 120 above ground. The treatment system 120 may operate by any suitable treatment technique.

The control system 118 is also connected to a sound generator 121 which generates high frequency sound energy. The sound generator 121 is connected to the sound energy applicator 114. The sound generator 121 may alternatively be connected to a sound energy applicator 117 located on the ground near the wellbore. The sound energy enhances the physical-chemical phenomena by helping mass transfer of contamination away from the soil and/or waste particles. This is achieved by additional vibrations of soil and solid waste, water vapor, vapor and gas particles in the media being decontaminated. The system will work without sound energy. Sound energy, however, is useful in enhancing and accelerating the decontamination process.

The treatment system 120 contains a vacuum pump connected to the vapor collection pipes 115. The vacuum pump discharges the collected materials into a conventional physical or chemical treatment unit. Examples of conventional treatment or collection systems are incineration, thermal oxidation, catalytic oxidation, carbon absorption, ion exchange, reverse osmosis membranes, ultrafiltration membranes, bag house filtration, cryogenic condensation and others. The selection of the combination of treatment method depends on the pollutants being removed from the treated site.

The vapor collection pipe 115 contains slots 122 for receiving vapors from the ground. The slots 122 may be covered with screen and/or suitable gravel pack in order to prevent soil from entering the pipe.

The antenna 112 is constructed in sections to adapt to varying depth wells. Some of the antenna sections may be nonradiating, so that energy is not applied to uncontaminated regions.

Figure 4:
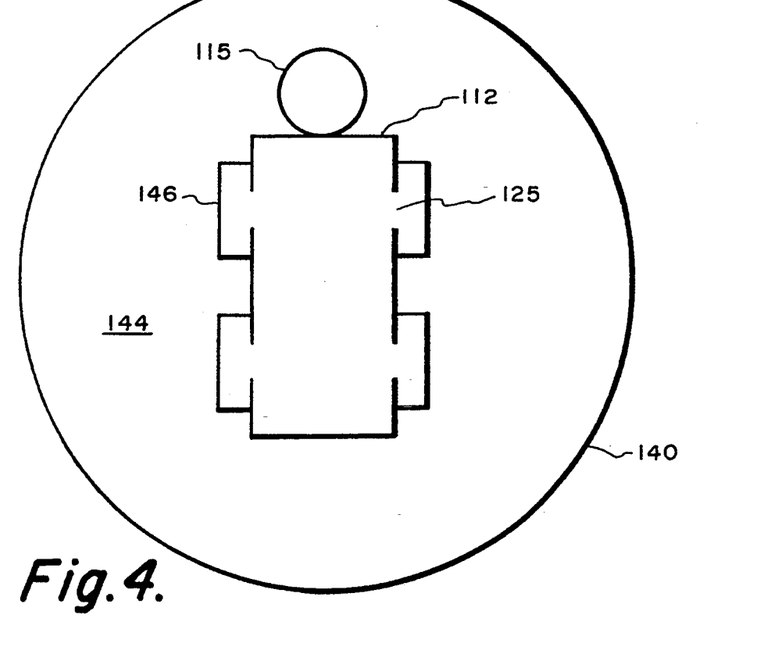
FIG. 4 is a cross-sectional view of a well containing a slot waveguide antenna and a vapor collection pipe.

FIG. 4 is a cross-sectional view of the wellbore wherein the antenna 112 is a slotted waveguide. The waveguide structure has slots 125 which radiate electromagnetic energy. The slots 125 are located on the wide wall of the waveguide.

In one embodiment of the present invention, the antenna 112 and vapor collection pipe 115 may be enclosed in a well casing 140. The well casing 140 can consist of any high temperature microwave transparent tubes (PTFE tubes, for example). This embodiment is best for temperature up to 150°-200° C. The vapor collection pipe 115 is located as close as possible to the nonradiating side of the waveguide antenna 112 in order to minimize its exposure to electromagnetic radiation (i.e., located in a "shadow" of the radiation pattern).

In an alternative embodiment, the waveguide antenna 112 itself is used as a casing which enables heating to very high temperatures limited by the metallic tubes comprising the waveguide.

The gaps 144 between the borehole and waveguide are filled with dry sand or other suitable material which is transparent to microwaves. In order to avoid soil from penetrating into the hollow waveguide, the radiating slots are covered with high temperature radome material 146 (ceramics, glass ceramics, or fiberglass reinforced plastics). This cover 146 and the dry sand are also useful in minimizing the change of the slot impedance if soil was in direct contact with the slot.

The vapor collection pipe 115 is placed on the narrow wall of the waveguide. For wells situated on the contamination envelope, antennas with slots on the contamination side only are more efficient in restricting outside radiation and concentrating radiation inside the desired volume.

Figure 5:
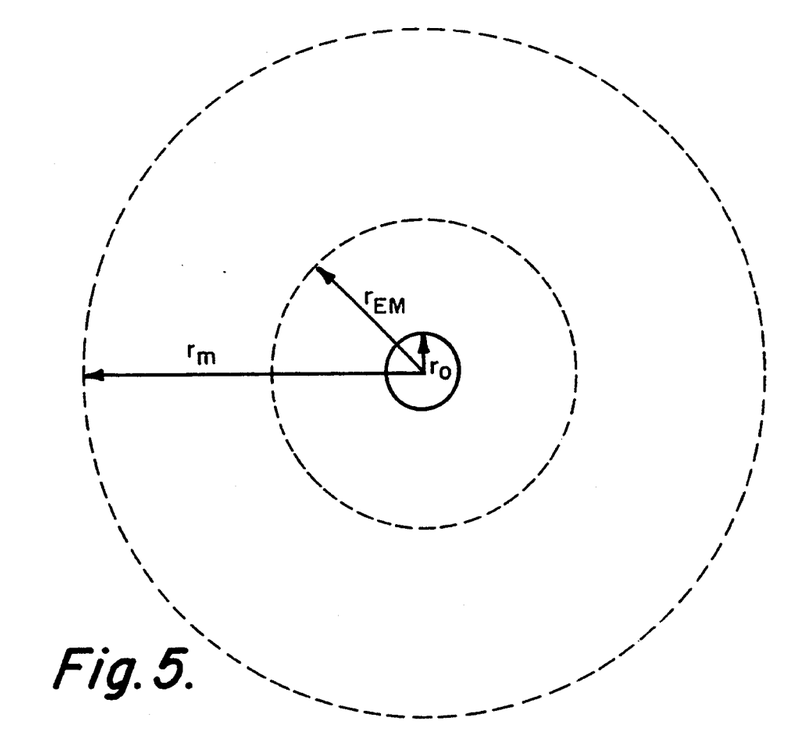
FIG. 5 illustrates the defined dimensions of a well within a borehole array.

FIG. 5 illustrates the defined dimensions of a well 104 within the borehole array 100. The physical wellbore radius is $r_0$. The effective EM heating radius is defined as $r_{EM}$, while the maximum uniform heating radius, $r_m$, is determined by the wellbore thermal diffusivity. If the same heating rate in all wells is assumed, the inner wells are approximately modeled by thermally isolated boundaries (except for the edge losses to be analyzed separately).

The basic idea of the borehole array 100 is to create uniform heating at the well spacing distance using heat transfer mechanisms, while at the same time avoiding excessive heat loss from the much larger array size. This phenomenon is assisted by the fact that the time constants of heat conduction are approximately related to the square of the heating radius (or spacing between the wells) and so an array will ensure a uniform heating between wells at much smaller times than those needed to cause significant heat loss to the surrounding zone. Because of this square relation, this is true even for moderate number of wells. For typical soil diffusivity, an array of wells can be drilled with 2 m (6.7') separation and more.

Cost analysis shows that at this separation, wellbore costs contribute only marginally to the decontamination costs in terms of $/ton. This contribution further decreases rapidly with the square of the wellbore spacing, as will be shown later. A sufficiently uniform heating can thus be reached in the time frames needed to heat the formation, even for high power levels which initially create highly nonuniform temperature profiles.

High power levels, with maximum limits set by soil break-down voltages (which are usually very high), are economically advantageous because they decrease the treatment time. This also reduces manpower costs and heat losses to the surrounding zones that are related to the treatment duration.

Most prior EM soil heating technologies are intended for oil production. In these applications, deep wellbore drilling and installation costs were a major factor. Reducing well spacing and use of the soil thermal diffusivity was less economically feasible. The case of soil decontamination, however, is quite different because (1) the cost of the cleanup boreholes is much lower than oil wells (which are much deeper) and (2) soil cleanup costs, in terms of $/ton, are much higher than those costs allowed for oil extraction. As a result, it is possible to systematically use the thermal conduction of the soil coupled with the effective increase of the wellbore radius created by the EM heating to achieve practical and economical uniform heating for soil decontamination.

Figure 6A:
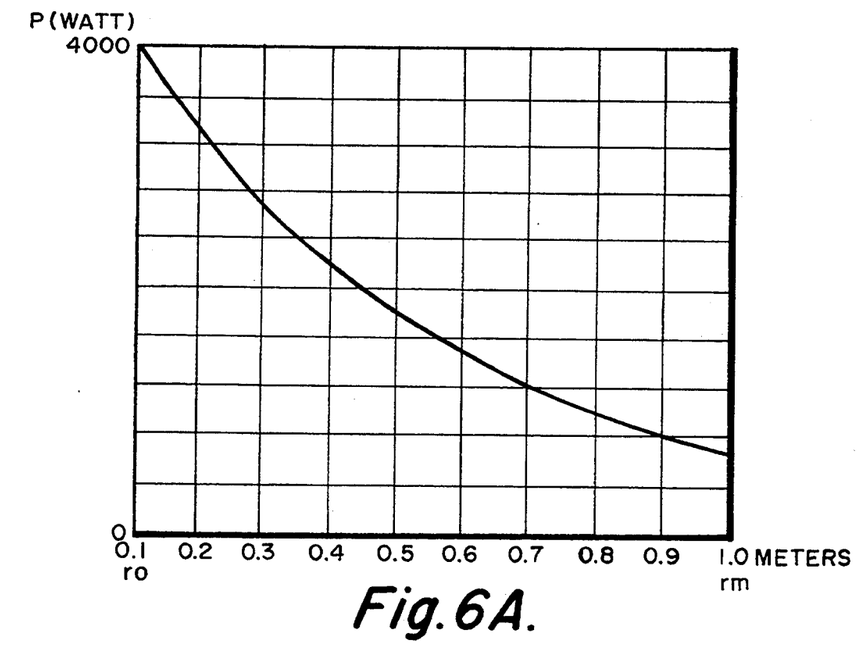
FIG. 6A illustrates electromagnetic radiated power distribution as a function of well radius.
Figure 6B:
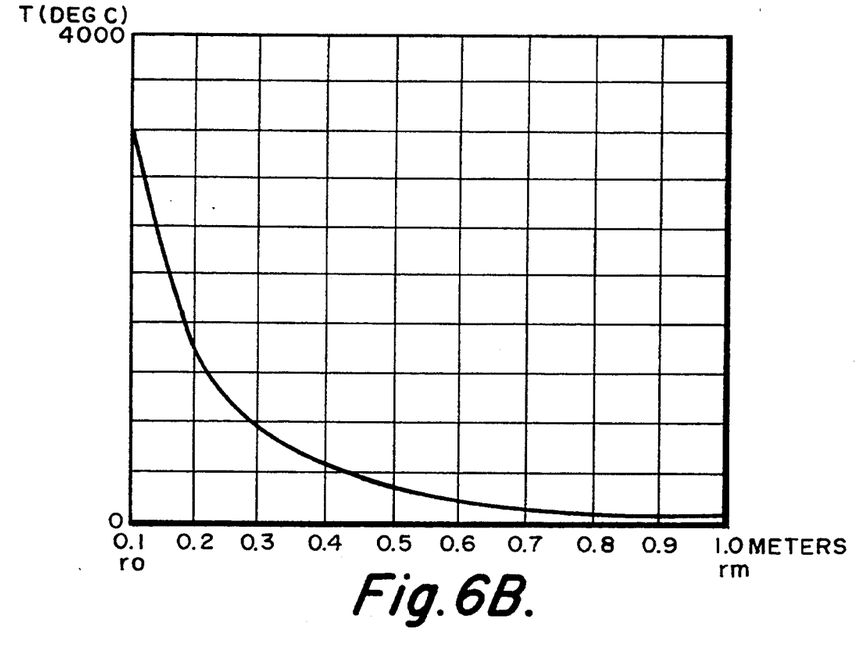
FIG. 6B illustrates the temperature profile as a function of well radius without heat transfer.

FIG. 6A depicts the power distribution along the wellbore radius for a power penetration depth of $\beta=0.5$ m (dry soil), a well separation of 2 m, a soil thermal diffusivity of 0.04 (2 m/day), and a power distribution along the well of 2 (kW/m). The wellbore physical diameter is 8". FIG. 6B illustrates the temperature profile along a well radius without heat transfer. The strong nonuniform heating and strong overheating of the wellbore can be seen from both FIGS. 6A and 6B.

Figure 7:
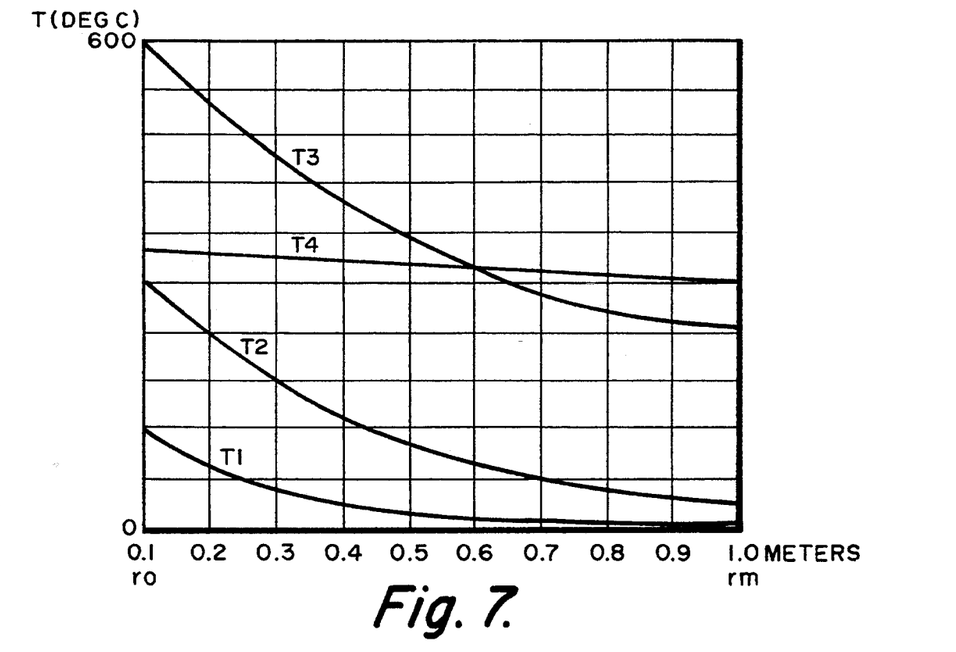
FIG. 7 illustrates the temperature profile as a function of well radius with heat transfer.

FIG. 7 illustrates the temperature profile of a single well 104 within the borehole array 100, with heat transfer by the thermal diffusivity of the soil. The advancing heating process can be seen for three discrete times: $t_1 = 0.5$ days, $t_2 = 2.5$ days, and $t_3 = 10$ days. Power is off at $t_3 = 10$ days. After a cooling time of 4 days ($t_4$), the initial temperature nonuniformity of 348° C. between $r_m$ and $r_0$ is reduced by a factor of 10:1. For lower power (lower heating rates), the desired amount of uniform heating, measured by the temperature change along the well radius, can be reached with minimal cooling time, or even no cooling time. On the other hand, if the heating power is too low, there will be excessive heat loss to the surrounding uncontaminated zone.

Figure 8A:
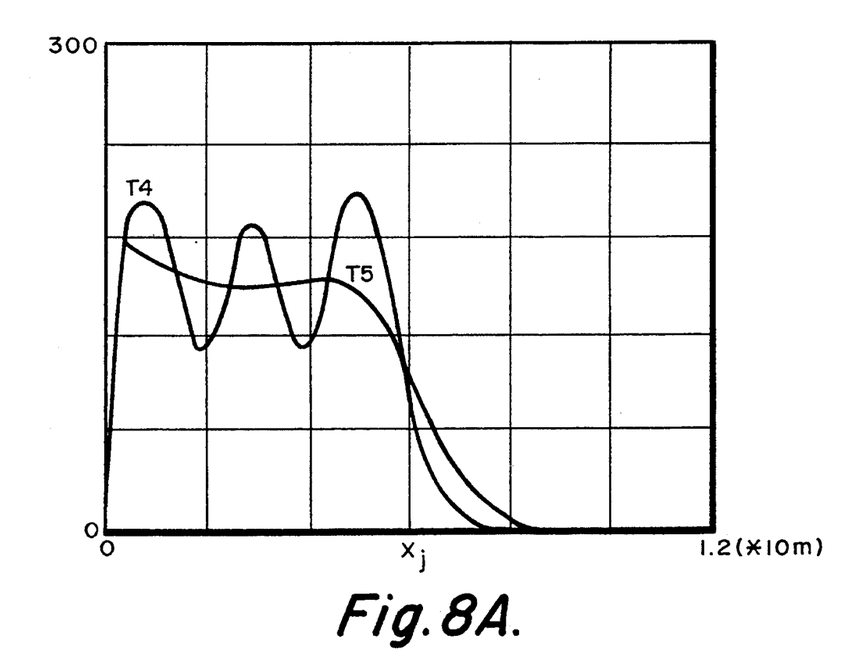
FIG. 8A and FIG. 8B illustrate the temperature profile along a row of wells with the effect of heat loss to the surrounding area.
Figure 8B:
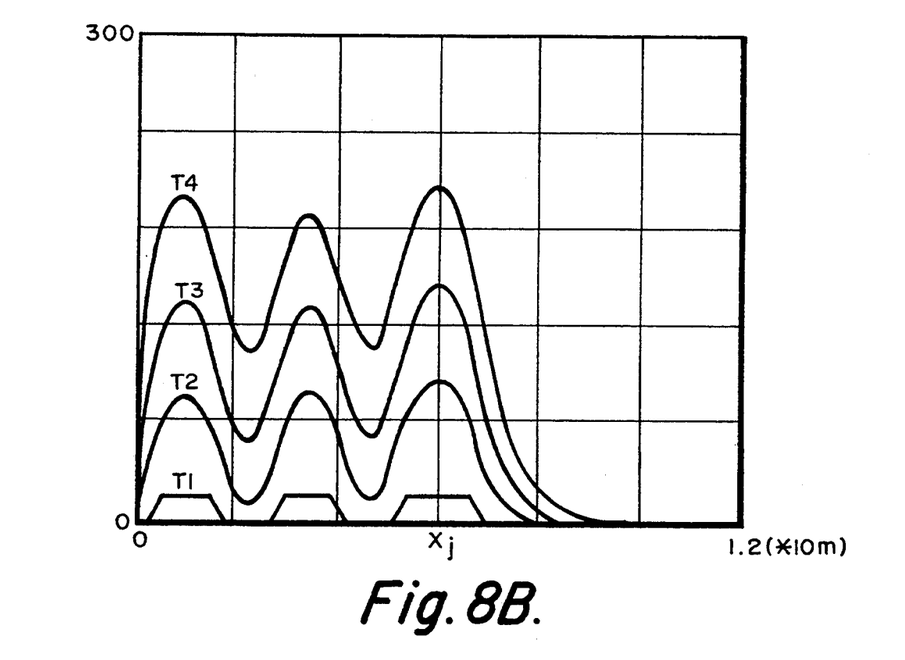

The effects of the total wellbore array heating, including the envelope (edge) heat loss effect, is illustrated in FIGS. 8A and 8B. These figures describe the temperature profiles of a dry soil from the center of a 10 m×10 m×10 m volume along the central well array where six wells are evenly distributed 2 m (6.7 feet) apart. For simplicity, the local heating around each well is assumed to be uniform with an effective (average) heating depth of 0.5 m. The soil thermal diffusivity is 0.08 (2 m/day).

Figure 9:
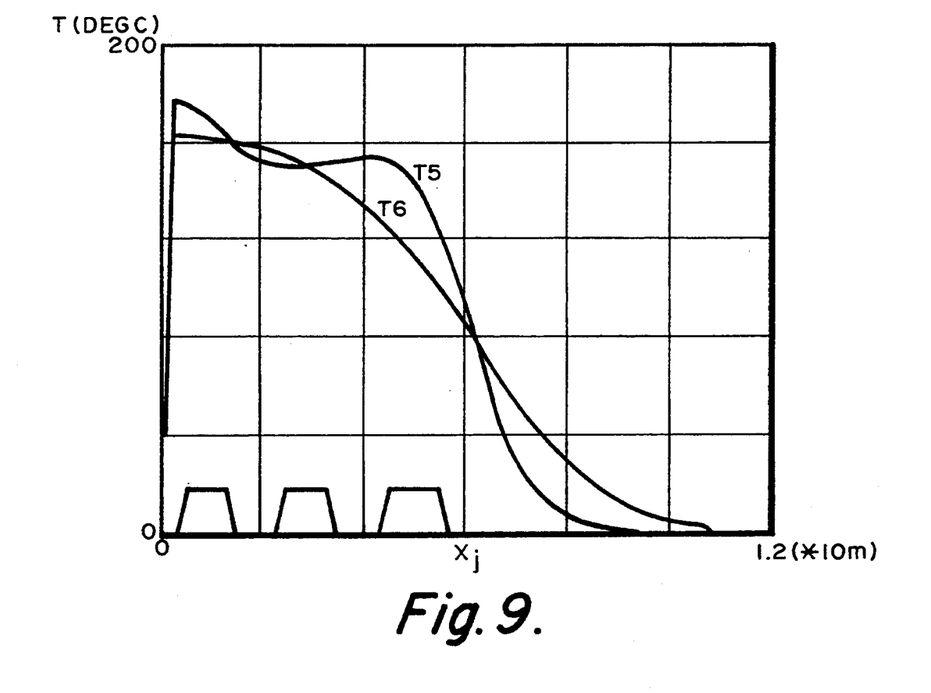
FIG. 9 illustrates the temperature profile along a row of wells with the effect of long term heat loss to the surrounding area.

FIG. 8B illustrates the temperature profile during the heating period at times $t_1 = 0.4$, $t_2 = 2$, $t_3 = 4$, $t_4 = 6.24$ days (each time step is: $dt = 0.4$ days). FIG. 8A is the temperature before and after the cooling period (starting at $t_4 = 6.24$ days and ending at $t_5 = 11.7$ days). The initial temperature variation of 124° C. (maximum) was reduced to about 30° C. (maximum). The longer term effect of heat loss to the surrounding area is evident from FIG. 9, which illustrates the temperature profile at $t_6 =$ one month with that of $t_5 = 11.7$ days. The cooling process also ensures uniform temperature distribution at the center between any 4 wells of the array.

Figure 10:
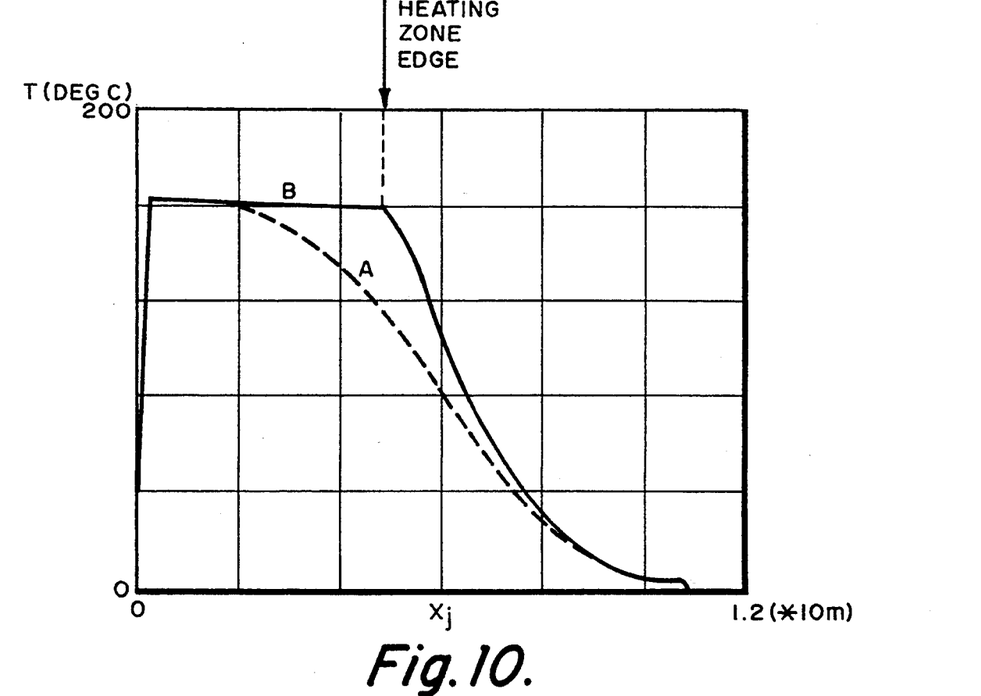
FIG. 10 illustrates the heat loss compensation effect resulting from the present invention.

A unique advantage of the wellbore array layout is the ability to compensate for the edge heat loss effect. This ability is illustrated in FIG. 10 where the edge wells are continuously powered, after power shut off, with only 4.3% of the total power to compensate for the edge heat loss. Curve B is the temperature profile after one month, which is highly uniform compared with the previous uncompensated case (curve A). Heating rates of the wellbore array are economically important to reduce heating time and minimize loss to surrounding area. Maximum heat transfer of the wells is limited by the maximum allowed wellbore temperature with respect to the desired final temperature, the soil thermal diffusivity, and wellbore dimensions $r_0$, $r_m$. EM heating enables substantial enlargement of the wellbore effective radius, thus increasing heating rates, reducing treatment time or equivalently increasing possible wellbore spacing. It is also less sensitive to interference in heat transfer from the wellbore physical radius like loose soil, cracks, etc. since EM energy propagates without attenuation through air gaps.

EM heating has the advantage of being able to create very high temperatures on the wellbore limited by maximum allowable metallic antenna temperature. This high temperature allows a wider range of contaminations to be treated. In addition, even when final desired volume temperature is lower, higher temperature at the wellbore allows higher average heat transfer power with resulting shorter treatment times.

The heating and cooling process may be thermostatically controlled by use of temperature sensors inserted into the ground symmetrically between the wells and also on the envelope zones. This control can be done per module or, more economically, per zone (a group of modules). The well casing, and/or the waveguide casing antenna is similarly protected from overheating by placing temperature sensors on the well casing or waveguide antenna. The soil is heated to the desired temperature and then cooled for the time needed to reach the desired level of uniform heating, around the desired final temperature of the soil.

A lower cost control, although less effective, can be achieved by using the wellbore casing sensors only in a sequence of heating/cooling periods. This automatic thermostatic control ensures a uniform heating despite the differences in thermophysical properties of the soil from zone to zone. It adapts itself to the changes of the soil's thermophysical and electrical properties during the heating process and eliminates the need to measure the exact soil parameters during heating. This process will also automatically compensate for envelope heat loss to the surrounding zones and avoids borehole or waveguide overheating.

In practice, since the major nonuniform heating results in the treated volume envelope, the temperature monitoring can be limited to regions including several modules each (such as central volume zones and envelope zones). In addition, while complete envelope heat loss compensation requires that each well will be divided into at least three sections, upper, lower, and middle, it is still possible to reduce heat loss from the envelope by an average factor of three, with one controlled power module per well. This is done by powering the boundary wells only.

The temperature sensing boreholes have relatively small diameters which do not increase the total drilling cost significantly. Thermostatic control of different zones within the volume also enables preprogramming of nonuniform temperature profiles needed to, for example, clean highly contaminated spots ("hot spots"), or different contaminating materials. Experiments with different soils showed good agreement with the theoretical analysis and computer simulation. Penetration depth of different soils were measured by measuring the soil dielectric constant.

In the present invention, the penetration depth should preferably be limited to the wellbore heating radius in order to avoid loss of energy from border wells. The limited penetration depth also facilitates strong attenuation from the inside volume and the overburdened layers to reduce out-of-ground radiation. This is in contrast to heating with much lower radio frequency (RF) (much larger penetration depth), where confined cavity structures are needed to reduce undesired radiation. Also, since the EM power has volumetric distribution, most of it is strongly attenuated within the soil volume before reaching the surface by the limited penetration depth, with final attenuation provided by the overburdened zone 106.

Relatively low frequency RF cavity structures are very sensitive to wide variations in electrical properties of the soil during heating, especially during water evaporation, which complicates the impedance matching to the soil.

It is preferred to use microwave radiation in the ISM (industrial, scientific, and medical) allocated frequencies. At these frequencies, the allowed atmospheric radiation is determined by personal safety levels while other frequencies are limited to much stricter communication interference levels. Either 915 $MH_z$ or 2450 $MH_z$ can be used. For higher penetration depths and somewhat higher efficiency, 915 $MH_z$ can be used. In some countries, other frequencies are allowed. Also, other suitable frequencies could be carried through the permit process with appropriate government agencies.

This antenna 112 provides equal power per unit length. Several possible antennae structures exist based on coaxial lines (for example, U.S. Pat. No. 4,743,725 to Risman) or slotted waveguides (such as that disclosed in C. M. DiLapi and J. A. Pearce, "A quantitative Comparison of Broad Wall Waveguide Slot Arrays for Heating of Lossy Dielectrics at 2.45 GHz," 24th Microwave Power Symposium, August 1989). The slot waveguide type is preferred for its high power and simple, durable high temperature structure. Waveguide dimensions at 2450 $MH_z$ are smaller than those at 915 $MH_z$, resulting in lower borehole and antenna costs at this higher frequency.

Figure 11:
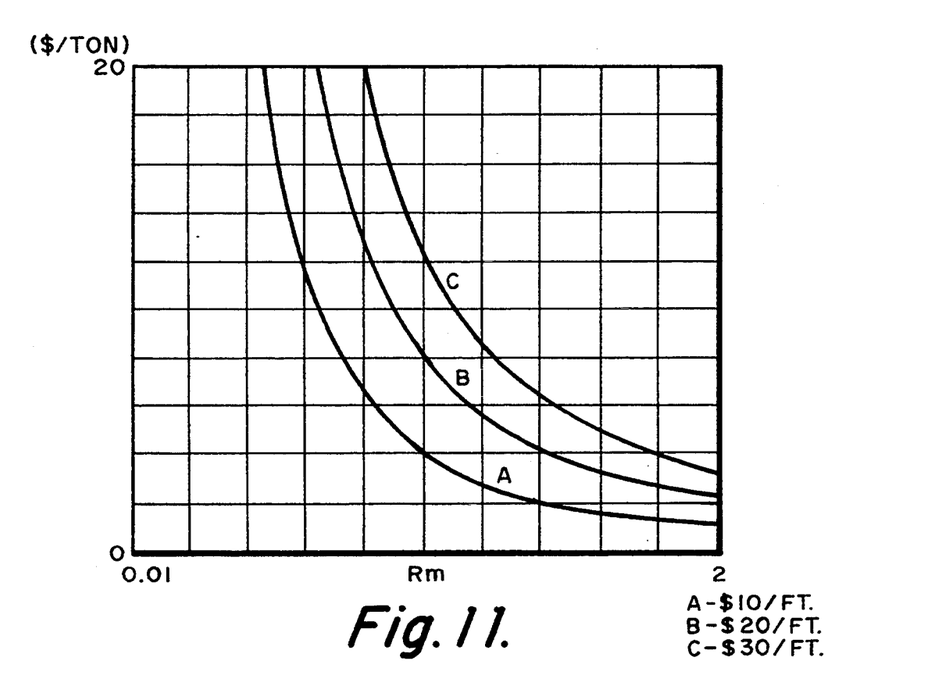
FIG. 11 illustrates the effect of borehole spacing on decontamination process cost.

The density of the borehole array impacts both temperature uniformity, time of treatment and ease of collection and disposal of the contaminants from the soil. The impact of the density of the borehole array on the cost of the cleanup is demonstrated in FIG. 11 (assuming a density of 2000 kg/m³ for a typical soil contamination case). In FIG. 11, the borehole cost (which is part of the fixed operating cost of the decontamination process) is plotted as a function of the final heating radius for several drilling costs. The final heating radius is approximately half the distance between boreholes. It can be seen, for example, that for drilling and installation costs of $20/ft (Curve B) the effect of the borehole cost on total cleaning cost for radius of 1 meter (3.3 feet) is only $8/ton. This cost further decreases as a square of the heating radius of wellbore separation.

In the case of the existence of a significantly thick, "clean" overburden zone above the contamination zone, the wellbore cost should include correction factors that take into account the thickness of the two zones and possible differences in the wellbore cost (in $/ft.) between the two.

Usually the volume to be heated has a nonrectangular shape. In the wellbore array method, the heating can be optimized to cover the lateral and vertical extent of the contamination zone only.

The advantages of the present invention are numerous. One obvious advantage is saved energy and cost. Since thermal efficiency generally improves with increase of the volume, it is more efficient to heat the maximum possible volume with a given power level. This means working with the largest borehole module volumes at a time.

For the purpose of illustration, conduction heat loss of an infinite, buried cube with dimension a, thermal conductivity k, and temperature difference T, is given by $P_{out} = 8.24$ kTa (watt). Since the desired treated volume is related to $a^3$, the heat efficiency (defined as $1-[P_{out}/P_{in}]$) is improved by a factor of $n^2$ when a is increased by a factor of n ($P_{in}$ is the input heating power). The strategy for improving efficiency by maximizing the volume is true also for asymmetrical volumes.

Another advantage of the present invention is the possibility of maintaining a constant, uniform temperature needed for the soaking time after heating up. This is done simply and automatically by continuing to heat the envelope, but only with the power equal to the thermal power loss to the surrounding zone. This maintains the uniform heating for a long time with minimum energy requirements and without overheating the central volume zone.

The fact that the heating system is built of modules has several distinct advantages:

(1) The flexibility to adapt and tailor the system to different site sizes and shapes;
(2) Lower costs in development and manufacturing large numbers of the same modules;
(3) Reliability aspects: failure of a module, or modules, does not severely degrade system performance;
(4) Reduced electrical and thermal stress on transmission lines, antennas and power modules producing better economy, reliability, and safety;
(5) Easier and safer treatment of lower power modules compared to very high power radiating sources;
(6) Avoidance of a central electromagnetic power distribution system;
(7) Lower cost because the relatively low power module concept can take advantage of the low cost of consumer or industrial heating magnetron tubes at 2450 $MH_z$ and 915 $MH_z$.

The provision of thermostatic control of the individual modules has the advantage of providing automatic uniform heating throughout the contaminated zone which compensates for changes of soil parameters during heating and water evaporation, and for the nonuniformity of the soil and different moisture contents.

The existence of the evenly distributed wellbore array enables easier, faster, and more efficient extraction and collection of the gases and vapors from the thermal treatment. Before installation of the full wellbore array treatment system, this borehole array can be used to determine the exact location of the contamination and therefore save on unnecessary treating of the clean soil and to avoid skipping contaminated zones. One possible method of incorporating the wellbore array drilling with refinement of the contamination zone envelope investigation is by starting the drilling from the center towards the envelope while sampling at the edge of the contamination. This is done in order to locate the vertical extent of the contamination zone at each well and the horizontal extent of the wellbore array and the contamination.

The present invention also provides the advantage of being useful for treating smaller sites within residential or industrial areas in situ (leaks from underground tanks at gasoline service stations, and other tank leaks, for example), where large EM power sources are inefficient. The present invention provides advantages in treatment of mixed waste, where radioactive waste is mixed with other chemicals such as volatile solvents, acids, or metal ions, for example. These chemicals may react with, and/or mobilize the radioactive waste and therefore accelerate and increase its spread in the environment. Removing solvents or organic acids, for example, by using this method, reduces or eliminates the movement of other waste associated with them such as radioactive waste and heavy metals.

The present invention advantageously provides several safety aspects. One is the safety of dealing with small power modules compared to central, very high power RF or microwave sources. The higher the power, the larger are the tube voltages involved.

Additionally, the use of relatively short microwave wavelengths with lower penetration depths ensures very high attenuation and therefore better shielding by the inside volume and overburdened layers. For example, when the ratio of overburden to electrical field penetration depth is 6, the attenuation of the power will be 160,000. Still much greater attenuation will be provided by moist overburden. Additional moisture or conductive sheets or metal net above ground can also be added, if ever needed.

Volumetric, three dimensional distribution of the EM energy significantly reduces the density of the radiated power outside the soil when compared with concentrated power.

All above attenuation factors are additional to the free space ($1/4 \pi r^2$) attenuation outside the soil.

The system of the present invention can also be provided with a central power interlock that shuts off the power if excessive radiation is detected.

All the above factors contribute to atmospheric radiation within safe limits.

The present invention is based on heating the soil in a near surface zone contaminated with organic compounds to a minimum temperature sufficient to vaporize the compounds or to thermally decompose the compounds and to vaporize the decomposition products. At least 70% and preferably 90% of the contaminants are vaporized by the remediation system of the invention. The zone is usually no more than 500 meters from the surface, typically no more than 100 meters from the surface. The heating is accomplished by radiating relatively short wavelength microwave energy into the zone from applicators (antennas) disposed in an array of wells.

The wells containing applicators are separated by 0.3 meters to 50 meters preferably 1 to 5 meters. The high density of applicators permits remediation of the contaminated zone in a relatively short period of from several days to several weeks. The remediation system of the invention is believed to be less expensive and faster than available state-of-the art methods.

It is to be realized that only preferred embodiments of the invention have been described and that numerous substitutions, modifications and alterations are permissible without departing from the spirit and scope of the invention as defined in the following claims.

We claim:

1. A method for in-situ decontaminating a shaped zone of contaminated soil, comprising the steps of:
   drilling an array of wells into and throughout the zone;
   placing a microwave energy antenna into a plurality of said wells within the zone and at the perimeter of the zone such that the distance between adjacent antennas is from about 0.3 to about 5 meters;
   radiating microwave energy independently from each of said antennas to heat the soil adjacent each said antenna to a first temperature high enough to heat by thermal conduction all the soil disposed between adjacent antennas to reach a second, minimum temperature sufficient to decompose and/or vaporize at least 90% of the contaminants in the soil between said adjacent applicators to form vapors and decomposition products; and
   recovering said vapors and decomposition products through at least one of said wells.

2. A method according to claim 1 in which said zone has a non-uniform depth and non-uniform perimeter and said antennas radiate microwave energy only within said zone.

3. A method according to claim 2 in which the antennas within the zone radiate microwave energy at a first level for a first period and the microwave energy radiating from at least some of the antennas is lowered during a second holding period.

4. A method according to claim 3 further including the step of terminating radiation of microwave energy from the antennas within the zone after said first period and radiating microwave energy from the antennas disposed on the perimeter of the zone during said second period to compensate for heat loss from said zone and to maintain said second temperature within the zone.

5. A method according to claim 4 in which said microwave energy radiating from the antennas disposed on the perimeter during said second period is at a level of less than 10% of the microwave energy radiating from the antennas during said first period.

6. A method according to claim 2 in which the wells are lined with a casing and the casing is transparent to said energy only in the region of the zone.

7. A method according to claim 1 further including the step of applying sound energy to said zone during the heating of the zone to facilitate removal of said contamination.

8. A method according to claim 1 in which said vapors and/or decomposition products are removed from the zone in the same wells containing the antennas.

9. A method according to claim 8 in which the vapors and decomposition products are recovered through said antennas.

10. A method according to claim 9 in which the vapor collection tube is disposed adjacent the non-radiating side of the antenna.

11. A method according to claim 8 in which each antenna is a microwave antenna and a vapor collection tube is disposed within the well adjacent the antenna, each said antenna having a radiating side and a non-radiating side.

12. A method according to claim 1 in which each well contains an identical antenna.

13. A method according to claim 12 in which each antennas is symmetrically disposed in said zone.

14. A method according to claim 1 further including an array of temperature sensors disposed in said zone and the signals generated by said sensors are utilized to independently control the power to said antennas to achieve said minimum temperatures.

15. A method according to claim 14 in which said sensors are symmetrically placed within said zone and at the perimeter of said zone.

16. A method according to claim 14 in which the signals generated by the sensors are utilized to independently control the energy applied to each antennas.

17. A method according to claim 1 in which the distance between antennas is from 1 to 5 meters.

18. A method according to claim 17 in which the contaminated zone is no more than 500 meters from the surface.

19. A method according to claim 18 in which the contaminated zone is no more than 100 meters from the surface.

20. A method according to claim 1 in which said antennas are energized for a time sufficient to achieve a uniform temperature in the soil between adjacent antennas.

21. An apparatus for in-situ decontamination of a shaped zone of contaminated soil comprising in combination:
- an array of wells drilled into and throughout the zone;
- a microwave antenna disposed in each of a plurality of said wells within said zone and at the periphery of said zone such that the distance between adjacent antennas is from about 0.3 to about 5 meters;
- microwave generating means coupled to each of said antennas for radiating microwave energy to heat the soil surrounding each antenna to a first temperature sufficient to thermally conduct heat to and cause all the soil between adjacent antennas and throughout the zone to reach a second, minimum temperature sufficient to decompose and/or vaporize at least 90% of the contaminants in the soil between said adjacent antennas and the soil throughout said zone to form vapors and decomposition products; and
- recovery means coupled to a least one of said wells for recovering said vapors and decomposition products from said zone.

22. An apparatus according to claim 21 in which the applicators are antennas and further including means associated with the antennas for radiating microwave energy only within the vertical and horizontal limits of the contaminated zone.

23. An apparatus according to claim 22 in which each well containing said antenna is lined with a casing and said casing is transparent to microwave energy only within the zone.

24. An apparatus according to claim 21 in which the microwave energy radiating means is capable of independently powering a plurality of antennas at a level different than other antennas.

25. An apparatus according to claim 24 in which said radiating means is capable of lowering the microwave energy output to antennas within the zone while maintaining microwave energy output by the antennas at the periphery of the zone to compensate for heat losses.

26. An apparatus according to claim 21 further including means for applying sound energy to the zone while said zone is heated.

27. An apparatus according to claim 21 in which said antennas are symmetrically disposed in said zone.

28. An apparatus according to claim 21 in which said vapor recovery means is disposed in the wells containing the antennas.

29. An apparatus according to claim 28 in which the vapor collection means is disposed adjacent or within the antenna.

30. An apparatus according to claim 21 further including an array of temperature sensors disposed in said zone, the output of said sensors being coupled to said microwave generating means to lower or raise the output of microwave energy from said microwave generating means to said antennas.

* * * * *